United States Patent
Ohmi et al.

(10) Patent No.: US 7,140,647 B2
(45) Date of Patent: Nov. 28, 2006

(54) FLUID COUPLING

(75) Inventors: Tadahiro Ohmi, 2-1-17-301, Komegafukuro, Aoba-ku, Sendai-shi, Miyagi 980-0813 (JP); Michio Yamaji, Osaka (JP); Shinya Nojima, Osaka (JP); Yukito Katsumi, Osaka (JP); Tsutomu Shinohara, Osaka (JP)

(73) Assignees: Tadahiro Ohmi, Sendai (JP); Fujikin Incorporated, Osaka (JP)

( * ) Notice: Subject to any disclaimer, the term of this patent is extended or adjusted under 35 U.S.C. 154(b) by 0 days.

(21) Appl. No.: 10/507,220

(22) PCT Filed: Mar. 18, 2002

(86) PCT No.: PCT/JP02/02533

§ 371 (c)(1),
(2), (4) Date: Apr. 27, 2005

(87) PCT Pub. No.: WO03/078883

PCT Pub. Date: Sep. 25, 2003

(65) Prior Publication Data

US 2005/0225084 A1 Oct. 13, 2005

(51) Int. Cl.
*F16L 25/00* (2006.01)

(52) U.S. Cl. .................. 285/328; 285/354; 285/917; 277/608; 277/644; 277/925

(58) Field of Classification Search ............. 277/644, 277/630, 637, 925, 608, 609, 616, 626; 285/328, 285/354, 917
See application file for complete search history.

(56) References Cited

U.S. PATENT DOCUMENTS 6,161,875 A 12/2000 Yamaji et al.

*Primary Examiner*—Aaron Dunwoody
(74) *Attorney, Agent, or Firm*—Armstrong, Kratz, Quintos, Hanson & Brooks, LLP

(57) ABSTRACT

Two coupling members are provided in respective butting end faces thereof with annular recessed portions surrounding respective fluid channels thereof and having annular projections each formed in a bottom face of the recessed portion. A gasket comprises a sealing portion having an outside diameter smaller than the diameter of the recessed portions and is positioned between the projections of the coupling members, and a guide has an outside diameter permitting the guide to be fitted into the recessed portions and positioned externally of the sealing portion. The butting end faces of the coupling members are movable into contact with each other when the coupling is tightened up properly. The sealing portion has an annular groove formed in an outer periphery thereof, and the sealing portion and the guide are connected together by a snap ring fitted in the annular groove.

2 Claims, 2 Drawing Sheets

FLUID COUPLING

TECHNICAL FIELD

The present invention relates to fluid couplings, and more particularly to fluid couplings comprising a gasket which gives predetermined sealing properties to the coupling when deformed.

PRIOR ART

FIG. 4 shows a fluid coupling already known. With reference to this drawing, first and second coupling members 41, 42 provided with annular projections 41a, 42a on opposed faces thereof are butted against each other with a gasket 43 interposed therebetween. A cap nut 44 screwed on the first coupling member 41 is tightened up to deform the gasket 43 and give a proper sealing force. Indicated at 45 is a thrust ring for facilitating the rotation of the cap nut 44.

With such a fluid coupling, the proper amount of rotation to be given to the cap nut 44 after the nut is manually tightened is predetermined so as to obtain the proper sealing force by pretightening the nut manually and fully tightening up the nut with a jig. To ensure the proper sealing force, it is also practice to measure the torque of tightening the nut and to cease tightening when a proper torque is given.

When the conventional fluid coupling is handled actually, it is likely that the coupling will be tightened up to excess or the sealing force will differ from worker to worker. Although the worker intends to ensure the proper amount of rotation or the proper torque, there arises the problem of faulty tightening due to a difference from the proper value.

An object of the present invention is to provide a fluid coupling which is made free of faulty tightening such as excessive tightening.

DISCLOSURE OF THE INVENTION

The present invention provides a fluid coupling comprising a first and a second coupling member having respective fluid channels in communication with each other, an annular gasket interposed between butting end faces of the two coupling members, and screw means for connecting the two coupling members together, each of the coupling members being provided in the butting end face thereof with an annular recessed portion surrounding the fluid channel thereof and having an annular projection formed in a bottom face of the recessed portion, the gasket comprising a sealing portion having an outside diameter smaller than the diameter of the recessed portion and positioned between the annular projections of the two coupling members, and a guide having an outside diameter permitting the guide to be fitted into the recessed portion and positioned externally of the sealing portion, the butting end faces of the two coupling members being movable into contact with each other when the coupling is tightened up properly.

With the fluid coupling of the present invention, the sealing portion of the gasket is deformed by tightening the coupling to produce a sealing force, and further continued tightening of the coupling moves the butting end faces of the two coupling members into contact with each other. This makes it impossible to tighten up the coupling any longer, consequently precluding the coupling from being tightened excessively or insufficiently. The guide restrains the coupling member from shifting radially thereof beyond a predetermined range.

The sealing portion of the gasket and the guide thereof may be in the form of an integral piece but are preferably connected together separably, for example, by a snap ring. Stated more specifically, the sealing portion preferably has an annular groove formed in an outer periphery thereof to connect the sealing portion and the guide together by a snap ring fitted in the annular groove. To connect the sealing portion and the guide together effectively and to make it possible to position the guide relative to the sealing portion radially thereof in this case, it is desirable to form an annular groove also in an inner periphery of the guide.

It is further desirable that the guide comprise a large-diameter portion fitting in the recessed portion of one of the coupling members without play and a small-diameter portion loosely fitted in the recessed portion of the other coupling member. This structure prevents the guide from moving relative to the above-mentioned one coupling member radially thereof to restrain the other coupling member from moving relative to the guide radially thereof beyond the predetermined range, consequently preventing a fault from developing in the sealing properties owing to a shift.

Preferably, the guide is separably connected to one of the coupling members by a snap ring so as not to slip out of the coupling member. Stated more specifically, the guide preferably has an annular furrow formed in an outer periphery of the large-diameter portion thereof to connect the guide and one of the coupling members together by a snap ring fitted in the annular furrow. This prevents the gasket from inadvertently slipping out of the coupling member when the coupling is disassembled.

BEST MODE OF CARRYING OUT THE INVENTION

An embodiment of the invention will be described below with reference to the drawings.

Figure 4:
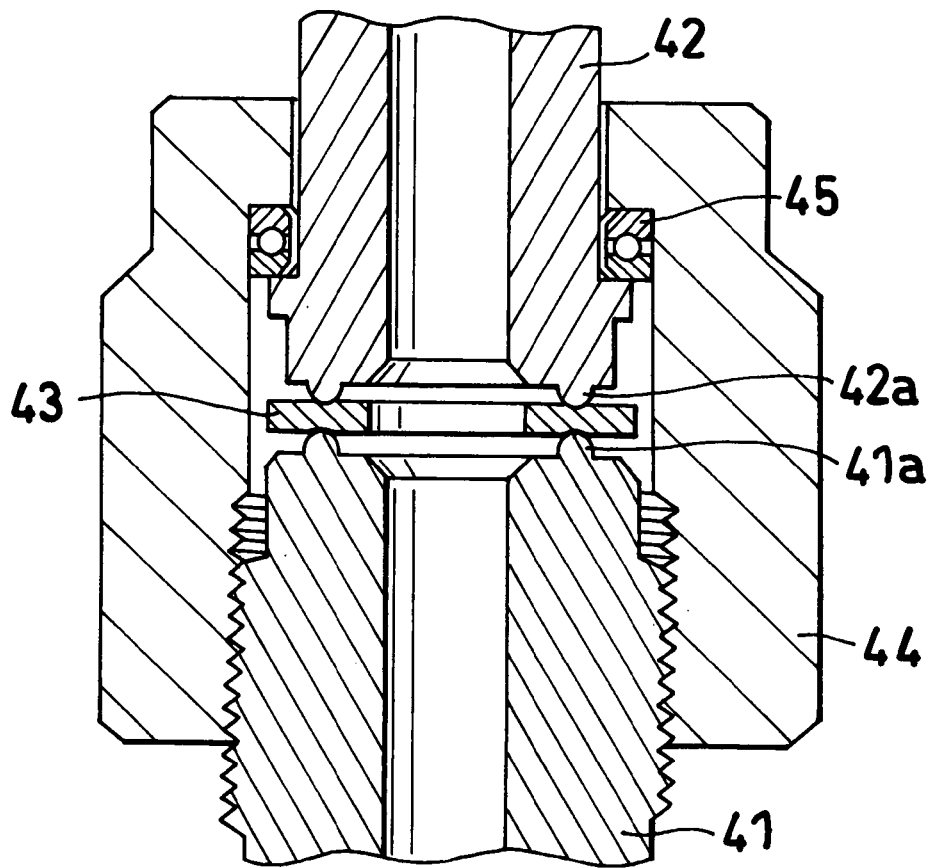
FIG. 4 is a view in longitudinal section showing a conventional fluid coupling.

The fluid coupling of the invention has a structure for joining two coupling members 1, 2 fluid-tightly. The coupling comprises first and second coupling members 1, 2 having respective fluid channels 1a, 2a communicating with each other, an annular gasket 10 interposed between butting end faces of the two coupling members 1, 2, and screw means for fastening the coupling members 1, 2 together. (Although the screw means is not shown, various known means are usable such as the one shown in FIG. 4.)

Annular recessed portions 3, 4 surrounding the openings of the fluid channels 1a, 2a are formed in the butting end faces of the first and second coupling members 1, 2, respectively, and annular projections 5, 6 are formed in the bottom faces of the recessed portions 3, 4.

The gasket 10 comprises an annular sealing portion 11 positioned between the annular projections 5, 6 of the coupling members 3, 4, and an annular guide 12 attached to the outer periphery of the sealing portion 11 by a snap ring 13.

The sealing portion 11 is made of stainless steel and is a portion serving the same function as conventional gaskets and having an outside diameter smaller than the diameter of the annular recessed portions 3, 4 of the coupling members 1, 2 and an inside diameter approximately equal to the diameter of the fluid channels 1a, 2a of the coupling members 1, 2. The annular projections 5, 6 of the coupling members 1, 2 are so provided as to come into contact with the midportion of the sealing portion 11.

The sealing portion 11 is provided in its outer periphery with an annular groove 14 for the snap ring 13 to fit in. The snap ring 13 is C-shaped so as to exhibit elasticity, has an outside diameter greater than the inside diameter of the guide 12 when in a free state and prevents the guide 12 from slipping off from the sealing portion 11 by virtue of the elastic force of the ring 13 acting to expand radially outward. The diameter of the bottom face of the sealing portion 11 which face defines the annular groove 14 is smaller than the inside diameter of the snap ring 13 in its free state, and the snap ring 13 is not restrained from moving radially inwardly thereof. Accordingly, the guide 12 and the sealing portion 11 are held connected together unless subjected to a force from outside and can be readily separated from each other when subjected to a force greater than the elastic force of the snap ring 13.

Figure 1:
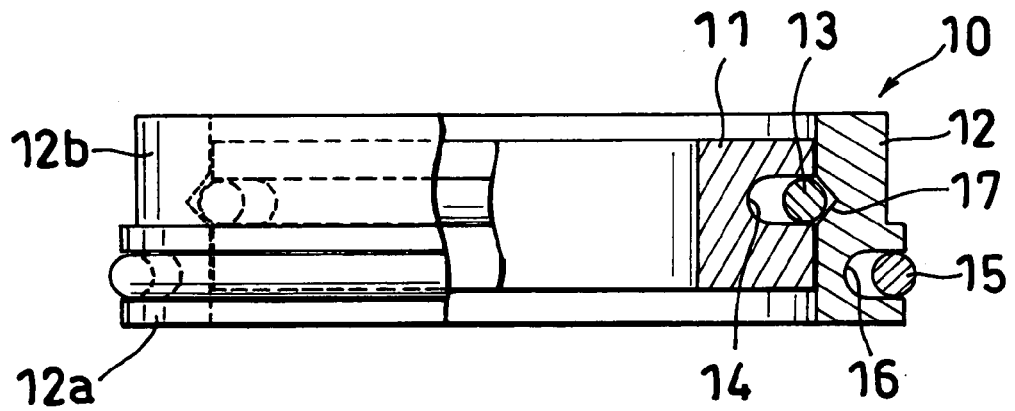
FIG. 1 is a view showing a gasket for use in a fluid coupling according to the invention.

The guide 12 is made of stainless steel and has such an outside diameter that the guide 12 can be fitted into the annular recessed portions 3, 4 of the coupling members 1, 2, and such an inside diameter as to fit around the sealing portion 11. Stated more specifically, the guide 12 comprises a large-diameter portion 12a fittable into the annular recessed portion 3 of the first coupling member 1 without play and a small-diameter portion 12b loosely fittable into the annular recessed portion 4 of the second coupling member 2. The large-diameter portion 12a is provided in its outer periphery with an annular furrow 16 for a snap ring 15 to fit in. The snap ring 15 is C-shaped so as to be elastic, has an outside diameter larger than the diameter of the annular recessed portion 3 of the first coupling member 1, accordingly, larger than the outside diameter of the large-diameter portion 12a of the guide 12 when in a free state, and is projected outward beyond the outer periphery of the large-diameter portion 12a as shown in FIG. 1. The elastic force of the snap ring 15 acting to expand radially outwardly thereof holds the guide 12 on the first coupling member 1. The diameter of the bottom face of the large-diameter portion 12a which face defines the annular furrow 16 is smaller than the inside diameter of the snap ring 15 in its free state, and the snap ring 15 is not restrained from moving radially inwardly thereof. When the coupling members 1, 2 are separated from each other, therefore, the gasket 10 is prevented from slipping out of the coupling member 1 while the gasket is not subjected to a force from outside. If subjected to a force greater than the elastic force of the snap ring 15, the gasket 10 is removable from the first coupling member 1 with a small force.

The guide 12 is provided in its inner periphery with a V-shaped shallow groove 17 for fitting therein an outer peripheral portion of the snap ring 13 to hold the sealing portion 11 and the guide 12 together. This makes it more difficult for the guide 12 to slip off from the sealing portion 11, also serving to position the guide 12 in place relative to the sealing portion 11 radially of the sealing portion 11.

Figure 2:
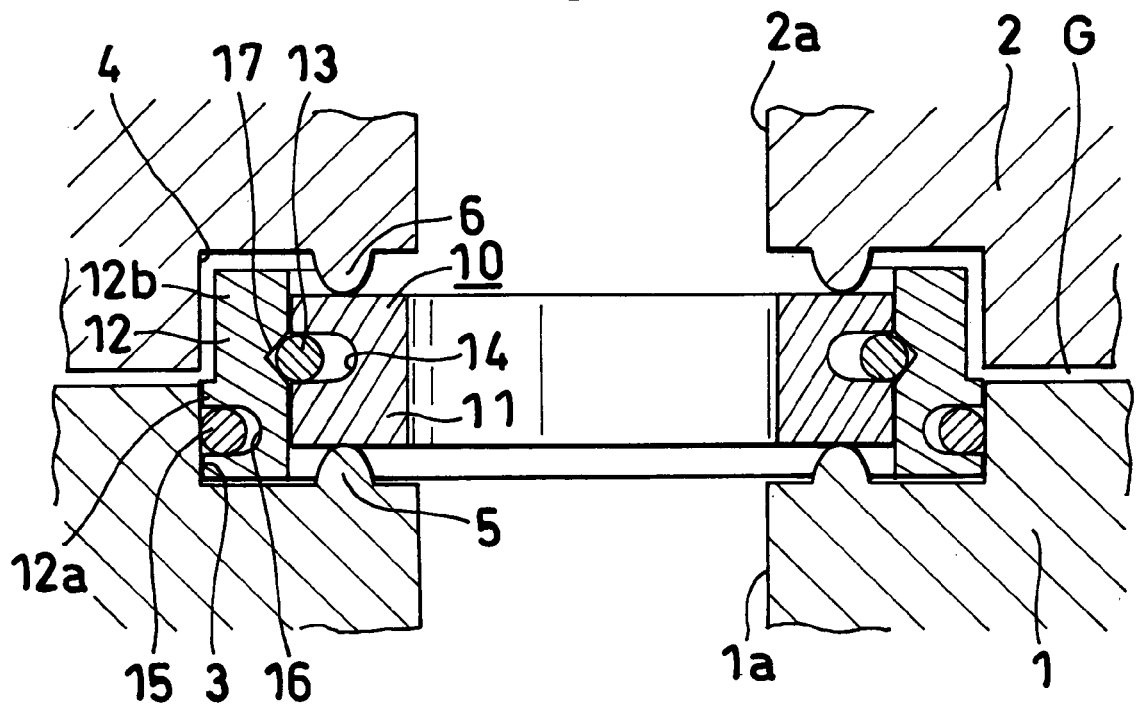
FIG. 2 is a view in longitudinal section showing the fluid coupling of the invention as tightened manually.

FIG. 2 shows the fluid coupling of the invention as tightened manually. With reference to this drawing, the value obtained by adding the combined height of the annular projections 3, 4 of the two coupling member 1, 2 to the entire thickness of the sealing portion 11 of the gasket 10 is slightly greater than the combined depth of the recessed portions 3, 4 of the two coupling members 1, 2. A gap G is therefore formed between the butting end faces (the portions having no recesses 3, 4) of the two coupling members 1, 2.

Figure 3:
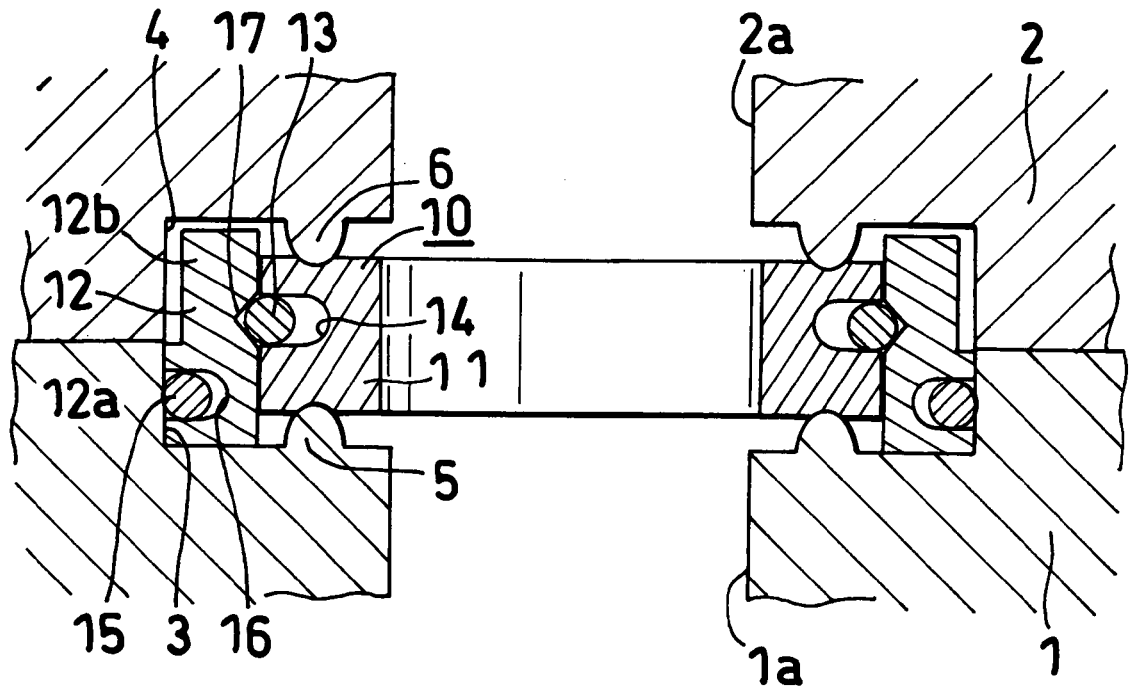
FIG. 3 is a view in longitudinal section showing the fluid coupling of the invention as completely tightened up.

FIG. 3 shows the fluid coupling of the invention as tightened up properly. With reference to this drawing, the gap G existing in the manually tightened state of FIG. 2 is reduced to zero. With the fluid coupling of the present invention, the gap G between the butting end faces of the two coupling members 1, 2 as tightened manually is made equal to the proper amount of tightening, and when the coupling is tightened up properly, the butting end faces of the two coupling members 1, 2 come into contact with each other. Accordingly, when the coupling is tightened with a jig, the sealing portion 11 of the gasket 10 is deformed first to produce a sealing force, and when the coupling is tightened up continuously, the butting end faces of the two coupling members 1, 2 come into contact with each other, permitting the coupling to be tightened no longer and thus precluding excessive tightening or insufficient tightening.

Incidentally, not the large-diameter portion 12a of the guide 12 but the small-diameter portion 12b thereof is shown in FIG. 2 as fitted in the second coupling member 2, which is therefore likely to shift correspondingly. However, since the annular projections 5, 6 of the two coupling members 3, 4 are adapted to come into contact with the midportion of the sealing portion 11, such a shift will not displace the annular projections 5, 6 from the sealing portion 11, hence no impairment of sealing properties.

INDUSTRIAL APPLICABILITY

The invention provides a fluid coupling which is suitable for use in fluid control devices, for example, of semiconductor fabrication apparatus as a coupling for connecting fluid control units together fluid-tightly.

The invention claimed is:

1. A fluid coupling comprising a first and a second coupling member having respective fluid channels in communication with each other, an annular gasket interposed between butting end faces of the two coupling members, and screw means for connecting the two coupling members together, each of the coupling members being provided in the butting end face thereof with an annular recessed portion surrounding the fluid channel thereof and having an annular projection formed in a bottom face of the recessed portion, the gasket comprising a sealing portion having an outside diameter smaller than a diameter of the recessed portion and positioned between the annular projections of the two coupling members, and a guide having an outside diameter permitting the guide to be fitted into the recessed portion and positioned externally of the sealing portion, the butting end faces of the two coupling members being movable into contact with each other when the coupling is tightened up properly, wherein the sealing portion has an annular groove formed in an outer periphery thereof, and the sealing portion and the guide are connected together by a snap ring fitted in the annular groove.

2. A fluid coupling comprising a first and a second coupling member having respective fluid channels in communication with each other, an annular gasket interposed between butting end faces of the two coupling members, and screw means for connecting the two coupling members together, each of the coupling members being provided in the butting end face thereof with an annular recessed portion surrounding the fluid channel thereof and having an annular projection formed in a bottom face of the recessed portion, the gasket comprising a sealing portion having an outside diameter smaller than a diameter of the recessed portion and positioned between the annular projections of the two coupling members, and a guide having an outside diameter permitting the guide to be fitted into the recessed portion and positioned externally of the sealing portion, the butting end faces of the two coupling members being movable into contact with each other when the coupling is tightened up properly, wherein the guide comprises a large-diameter portion fitting in the recessed portion of one of the coupling members without play and a small-diameter portion loosely fitted in the recessed portion of the other coupling member, and wherein the guide has an annular furrow formed in an outer periphery of the large-diameter portion thereof, and the guide and one of the coupling members are connected together by a snap ring fitted in the annular furrow.

* * * * *